(12) United States Patent
Ota et al.

(10) Patent No.: US 11,421,133 B2
(45) Date of Patent: Aug. 23, 2022

(54) THERMOSETTING CONDUCTIVE ADHESIVE

(71) Applicant: THREEBOND CO., LTD., Tokyo (JP)

(72) Inventors: Soichi Ota, Tokyo (JP); Makoto Kato, Tokyo (JP); Hitoshi Mafune, Tokyo (JP); Masayuki Osada, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 0 days.

(21) Appl. No.: 16/306,670

(22) PCT Filed: Jun. 23, 2017

(86) PCT No.: PCT/JP2017/023244
§ 371 (c)(1),
(2) Date: Dec. 3, 2018

(87) PCT Pub. No.: WO2018/003704
PCT Pub. Date: Jan. 4, 2018

(65) Prior Publication Data
US 2019/0177579 A1  Jun. 13, 2019

(30) Foreign Application Priority Data

Jun. 27, 2016  (JP) .............................. JP2016-126946

(51) Int. Cl.
| | |
|---|---|
| *C09J 5/06* | (2006.01) |
| *C09J 9/02* | (2006.01) |
| *C08K 3/08* | (2006.01) |
| *C08K 9/04* | (2006.01) |
| *C08G 18/09* | (2006.01) |
| *C08G 18/32* | (2006.01) |
| *H01B 1/22* | (2006.01) |
| *C09J 175/14* | (2006.01) |
| *C08G 18/81* | (2006.01) |
| *C08F 290/06* | (2006.01) |
| *C08G 18/67* | (2006.01) |

(52) U.S. Cl.
CPC ............ *C09J 9/02* (2013.01); *C08F 290/06* (2013.01); *C08G 18/09* (2013.01); *C08G 18/3221* (2013.01); *C08G 18/673* (2013.01); *C08G 18/8175* (2013.01); *C08K 3/08* (2013.01); *C08K 9/04* (2013.01); *C09J 5/06* (2013.01); *C09J 175/14* (2013.01); *H01B 1/22* (2013.01); *C08G 2170/00* (2013.01); *C08K 2003/0806* (2013.01); *C08K 2201/001* (2013.01); *C09J 2475/00* (2013.01)

(58) Field of Classification Search
CPC ..... C09J 5/06; C09J 9/02; C09J 175/14; C09J 2475/00; C08K 3/08; C08K 9/04; C08K 2003/0806; C08K 2201/001; C08G 18/09; C08G 18/3221; C08G 2170/00; H01B 1/22

See application file for complete search history.

(56) References Cited

U.S. PATENT DOCUMENTS

| | | | |
|---|---|---|---|
| 2004/0127626 A1 | 7/2004 | Yoshiko et al. | |
| 2009/0155597 A1 | 6/2009 | Kropp et al. | |
| 2009/0156074 A1* | 6/2009 | Lu | ........................... C09J 133/08 442/151 |
| 2009/0280332 A1* | 11/2009 | Akutsu | ................. C08F 290/06 428/423.1 |
| 2010/0186823 A1* | 7/2010 | Hsu | .......................... H01B 1/22 136/263 |
| 2014/0318709 A1* | 10/2014 | Sato | .......................... C09J 9/02 156/332 |
| 2015/0175817 A1* | 6/2015 | Fukaya | ................ C09D 163/00 252/514 |

(Continued)

FOREIGN PATENT DOCUMENTS

| | | |
|---|---|---|
| CN | 103987801 A | 8/2014 |
| JP | H07263493 A | 10/1995 |

(Continued)

OTHER PUBLICATIONS

International Search Report with English translation and Written Opinion dated Aug. 29, 2017 in corresponding International Application No. PCT/JP2017/023244; 11 pages.
Office Action dated Mar. 10, 2020 in corresponding Chinese Application No. 201780036802.X; 13 pages including English-language translation.
Chinese Office Action dated Nov. 2, 2020, in connection with corresponding CN Application No. 201780036802.X (15 pp., including machine-generated English translation).
Chinese Office Action dated Mar. 25, 2021, in connection with corresponding CN Application No. 201780036802.X (13pp., including machine-generated English translation).

(Continued)

*Primary Examiner* — Bijan Ahvazi
(74) *Attorney, Agent, or Firm* — Maier & Maier, PLLC

(57) ABSTRACT

A thermosetting conductive adhesive that can exhibit high conductivity (low connection resistance) when cured at a high temperature in a short time. The present invention also provides a thermosetting conductive adhesive that has excellent adhesive strength when cured at a high temperature in a short time. The thermosetting conductive adhesive according to the present invention includes components (A) to (D): component (A): a urethane-modified polyfunctional (meth) acrylate oligomer that is either an aromatic urethane-modified (meth)acrylate oligomer having six (meth)acryl groups in the molecule or an aliphatic urethane-modified (meth) acrylate oligomer having two (meth)acryl groups in the molecule; component (B): a monofunctional (meth)acrylate monomer; component (C): an organic peroxide; and component (D): conductive particles, in which when the component (A) is an aliphatic urethane-modified (meth)acrylate oligomer having two (meth)acryl groups in the molecule, the component (B) is a monofunctional acrylate monomer.

10 Claims, No Drawings

(56) References Cited

U.S. PATENT DOCUMENTS

| | | | |
|---|---|---|---|
| 2015/0282330 A1* | 10/2015 | Iseda | C09J 11/04 428/201 |
| 2015/0344749 A1* | 12/2015 | Ochi | C09J 9/02 252/75 |
| 2017/0152410 A1 | 6/2017 | Aoyama et al. | |
| 2018/0079935 A1* | 3/2018 | Ota | C09J 9/02 |

FOREIGN PATENT DOCUMENTS

| | | | | |
|---|---|---|---|---|
| JP | 2000-256641 A | | 9/2000 | |
| JP | 2004197030 A | | 7/2004 | |
| JP | 2006032165 A | * | 2/2006 | B22F 1/02 |
| JP | 2006032165 A | | 2/2006 | |
| JP | 2007269959 A | * | 10/2007 | C09J 11/04 |
| JP | 2008031277 A | | 2/2008 | |
| JP | 2011-506751 A | | 3/2011 | |
| JP | 2013253151 A | * | 12/2013 | C09J 11/04 |
| JP | 2014-102943 A | | 6/2014 | |
| JP | 5642147 B2 | | 12/2014 | |
| JP | 2015-154016 A | | 8/2015 | |
| JP | 2017-014341 A | | 1/2017 | |
| JP | 2017-066367 A | | 4/2017 | |
| KR | 1020140112017 A | | 9/2014 | |
| WO | 2013/089061 A1 | | 6/2013 | |
| WO | 2016031552 A1 | | 4/2017 | |

OTHER PUBLICATIONS

Japanese Office Action dated Feb. 24, 2021, in connection with corresponding JP Application No. 2018-525138 (11 pp., including machine-generated English translation).

Korean Office Action dated Apr. 14, 2021, in connection with corresponding KR Application No. 10-2018-7035117 (10 pp., including machine-generated English translation).

* cited by examiner

THERMOSETTING CONDUCTIVE ADHESIVE

FIELD

The present invention relates to a thermosetting conductive adhesive, and more specifically to a thermosetting conductive adhesive of which a cured product has isotropic electrical conductivity (conductivity).

BACKGROUND

Japanese Unexamined Patent Application Publication (Translation of PCT Application) No. 2011-506751 (US Patent Publication No. 2009/155597) discloses a conductive adhesive that is B-staged (semi-cured) by light irradiation and then thermally cured, and the conductive adhesive provides photocurability with a (meth)acrylate resin and thermosetting properties with an epoxy resin. In addition, Japanese Unexamined Patent Application Publication No. 2000-256641 discloses an anisotropically conductive adhesive containing an acrylate resin and a thermoplastic resin.

SUMMARY

According to the technique disclosed in Japanese Unexamined Patent Application Publication (Translation of PCT Application) No. 2011-506751 (US Patent Publication No. 2009/155597), however, light irradiation and thermosetting need to be performed before the conductive adhesive reaches a final cured state, so that two or more curing steps are required, and the conductive adhesive cannot be practically cured in a short time. Further, the anisotropically conductive adhesive disclosed in Japanese Unexamined Patent Application Publication No. 2000-256641 cannot ensure conductivity unless it is pressed under heating while being sandwiched between adherends having electrodes and is cured with conductive particles sandwiched between electrodes.

The demand for shorter curing time increases, and it is required to cure thermosetting conductive adhesives under a high temperature atmosphere in a short time (e.g., under an atmosphere of 110° C. to 130° C. for 1 second to 10 minutes, etc.). Under these conditions, however, there has been a problem in that the conductivity or adhesive force decreases. Further, in recent years, an adherend having nickel on its outermost surface is often used in terms of price or stability of the surface state. The use of the adherend, however, causes troubles of exhibiting high resistance or insufficient adhesive force, so that such troubles needs to be solved.

Accordingly, an object of the present invention is to provide a thermosetting conductive adhesive that exhibits high conductivity (low connection resistance) when cured at a high temperature in a short time. Another object of the present invention is to provide a thermosetting conductive adhesive that exhibits excellent adhesive strength to an adherend (in particular, an adherend having nickel on its outermost surface) when cured at a high temperature in a short time.

As a result of intensive studies in view of accomplishing the above objects, the present inventors have found that the problem can be solved by the thermosetting conductive adhesive having the following configuration. The present invention has been accomplished thereby.

A first embodiment of the present invention is a thermosetting conductive adhesive containing components (A) to (D):

component (A): a urethane-modified polyfunctional (meth)acrylate oligomer that is either an aromatic urethane-modified (meth)acrylate oligomer having six (meth)acryl groups in the molecule or an aliphatic urethane-modified (meth)acrylate oligomer having two (meth)acryl groups in the molecule component (B): a monofunctional (meth)acrylate monomer component (C): an organic peroxide component (D): conductive particles in which when the component (A) is an aliphatic urethane-modified (meth)acrylate oligomer having two (meth)acryl groups in the molecule, the component (B) is a monofunctional acrylate monomer.

A second embodiment of the present invention is the thermosetting conductive adhesive described in the first embodiment, in which the (meth)acryl group of the component (A) is an acryl group.

A third embodiment of the present invention is the thermosetting conductive adhesive described in the first or second embodiment, containing 50 to 1000 parts by mass of the component (D) relative to 100 parts by mass of the total of the component (A) and the component (B).

A fourth embodiment of the present invention is the thermosetting conductive adhesive described in any of the first to third embodiments, in which the component (C) is an organic peroxide represented by the following formula 1.

[Chemical Formula 1]

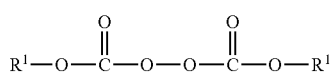

(Formula 1)

In the above formula 1, $R^1$ is each independently a substituted or unsubstituted monovalent hydrocarbon group.

A fifth embodiment of the present invention is the thermosetting conductive adhesive described in any of the first to fourth embodiments, in which the component (C) is an organic peroxide represented by the following formula 2.

[Chemical Formula 2]

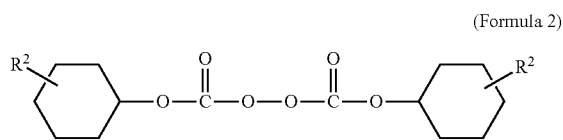

(Formula 2)

In the above formula 2, $R^2$ is each independently a hydrogen or a substituted or unsubstituted monovalent hydrocarbon group.

A sixth embodiment of the present invention is the thermosetting conductive adhesive described in any of the first to fifth embodiments, in which the component (D) is conductive particles that are surface-treated with stearic acid.

A seventh embodiment of the present invention is the thermosetting conductive adhesive described in any of the first to sixth embodiments, being used on an adherend having nickel on an outermost surface thereof.

DETAILED DESCRIPTION

The thermosetting conductive adhesive of the present invention (hereinafter referred to as "conductive adhesive"

or "adhesive") contains, as component (A), a urethane-modified polyfunctional (meth)acrylate oligomer that is either an aromatic urethane-modified (meth)acrylate oligomer having six (meth)acryl groups in the molecule or an aliphatic urethane-modified (meth)acrylate oligomer having two (meth)acryl groups in the molecule; a monofunctional (meth)acrylate monomer as component (B); an organic peroxide as component (C); and conductive particles as component (D), in which when the component (A) is an aliphatic urethane-modified (meth)acrylate oligomer having two (meth)acryl groups in the molecule, the component (B) is a monofunctional acrylate monomer. The adhesive having the above-mentioned configuration can achieve high conductivity (low connection resistance) when cured at a high temperature in a short time. In addition, the adhesive having the above-mentioned configuration can exhibits excellent adhesive strength to an adherend (in particular, an adherend having nickel on its outermost surface) when cured at a high temperature in a short time.

In the present specification, "high temperature" refers to from 80° C. to 200° C., preferably from 100 to 150° C., and more preferably from 110 to 130° C. Also, "short time" refers to from 1 second to 15 minutes, preferably from 30 seconds to 10 minutes, and more preferably from 1 to 5 minutes.

In the present specification, "X to Y" representing a range includes the lower limit value X and the upper limit value Y. Unless otherwise specified, the operation and measurement of characteristics or the like are performed under conditions of room temperature (20 to 25° C.)/relative humidity of 40 to 50%.

In the present specification, the term "(meth)acryl" means acryl and/or methacryl. Similarly, the term "(meth)acrylate" means acrylate and/or methacrylate.

The components in the adhesive of the present invention will be described hereinbelow.

[Component (A)]

The component (A) according to the adhesive of the present invention is a urethane-modified polyfunctional (meth)acrylate oligomer that is either an aromatic urethane-modified (meth)acrylate oligomer having six (meth)acryl groups in the molecule (hereinafter referred to as component (A-1)) or an aliphatic urethane-modified (meth)acrylate oligomer having two (meth)acryl groups in the molecule (hereinafter referred to as component (A-2)). The polyfunctional (meth)acrylate oligomer is a compound having two or more (meth)acryl groups in the molecule. Component (A) may be used alone or in combination of two or more kinds.

In particular, the component (A) preferably has an acryl group because the curability is high, and the effect of the present invention can be exhibited by curing for a shorter time. In other words, the component (A) is preferably an aromatic urethane-modified acrylate oligomer having six acryl groups in the molecule or an aliphatic urethane-modified acrylate oligomer having two acryl groups in the molecule. That is, in one embodiment of the present invention, the (meth)acryl group of the component (A) is an acryl group.

As the method of synthesizing the component (A), a synthesizing method by which a urethane bond is formed with polyol and polyisocyanate, and a compound having a hydroxyl group and a (meth)acryl group or an acrylic acid is then added to an unreacted isocyanate group is known.

As used herein, "aliphatic urethane-modified" refers to a state modified with an aliphatic or alicyclic polyisocyanate. Also, "aromatic urethane-modified" refers to a state modified with an aromatic polyisocyanate.

Examples of the aliphatic polyisocyanate include, but are not limited to, tetramethylene diisocyanate, hexamethylene diisocyanate, 2-methyl-1,5-pentane diisocyanate, and the like.

Examples of the alicyclic polyisocyanate include, but are not limited to, 1-methylcyclohexane-2,4-diisocyanate, isophorone diisocyanate, dicyclohexylmethane-4,4'-diisocyanate, and the like.

Examples of the aromatic polyisocyanate include, but are not limited to, 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, polyphenylene polymethylene polyisocyanate, 1,5-naphthylene diisocyanate, 1,4-naphthylene diisocyanate, p-phenylene diisocyanate, m-phenylene diisocyanate, o-xylylene diisocyanate, m-xylylene diisocyanate, and the like.

As the component (A), commercially available products may be used. Specific examples of the component (A-1) include, but are not limited to, 220 as EBECRYL (registered trademark, the same applies hereinafter) series available from Daicel Allnex Ltd. Specific examples of the component (A-2) include, but are not limited to, 8402, 8804, 9270 as EBECRYL series available from Daicel Allnex Ltd.

The component (A) preferably has a weight average molecular weight (Mw) in the range of 500 to 5,000, more preferably 800 to 2,000, and particularly preferably 1,000 to 1,500. When the weight average molecular weight thereof is within the above range, the effect of the present invention further improves. In the present specification, the weight average molecular weight (Mw) adopts a value measured by gel filtration chromatography (Gel Permeation Chromatography; GPC) using polystyrene as a standard material.

As for the component (A), the glass transition temperature of a cured product (hereinafter referred to as "cured product Tg") thereof is preferably in the range of 0 to 70° C. In particular, as for the component (A-1), the cured product Tg thereof is preferably in the range of 20 to 70° C., even more preferably 30 to 60° C., and particularly preferably 40 to 50° C. Also, as for the component (A-2), the cured product Tg thereof is preferably in the range of 0 to 40° C., more preferably 0 to 30° C., and even more preferably 10 to 20° C. When the cured product Tg is within the above ranges, the effect of the present invention further improves.

The content of the component (A) is preferably in the range of 10 to 60% by mass, more preferably 20 to 50% by mass, and even more preferably 30 to 40% by mass, relative to the total solid content of the adhesive. When the content is within the above range, the effect of the present invention further improves.

[Component (B)]

The component (B) according to the adhesive of the present invention is a monofunctional (meth)acrylate monomer, that is, a monomer having one (meth)acryl group in the molecule.

When the component (A-1) described above is used as the component (A), at least one of a monofunctional methacrylate monomer and a monofunctional acrylate monomer is used as the component (B). Alternatively, when the component (A-2) described above is used as the component (A), a monofunctional acrylate monomer is used as the component (B). These combinations of the components (A) and (B) can exhibit high conductivity (low connection resistance). In contrast, the combination of the component (A-2) as the component (A) and a monofunctional methacrylate monomer as the component (B) is not preferable because the connection resistance significantly increases (see Comparative Example 1).

In the combination of the component (A-1) with the component (B), the component (B) is preferably a monofunctional acrylate monomer, from the viewpoint that when cured at a high temperature in a short time, the adhesive exhibits low connection resistance regardless of the curing temperature. Alternatively, in the same combination, the component (B) is preferably a monofunctional methacrylate monomer, from the viewpoint that when cured at a high temperature in a short time, the adhesive exhibits excellent adhesive strength regardless of the curing temperature.

The component (B) may be used alone or in combination of two or more kinds.

Specific examples of component (B) include, but are not limited to, methyl (meth)acrylate, ethyl (meth)acrylate, propyl (meth)acrylate, n-butyl (meth)acrylate, 2-ethylhexyl (meth)acrylate, n-octyl (meth)acrylate, lauryl (meth)acrylate, stearyl (meth)acrylate, ethylcarbitol (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, benzyl (meth)acrylate, phenyl (meth)acrylate, phenoxyethyl (meth)acrylate, phenoxydiethylene glycol (meth)acrylate, phenoxy tetraethylene glycol (meth)acrylate, nonylphenoxyethyl (meth)acrylate, nonylphenoxytetraethylene glycol (meth)acrylate, methoxydiethylene glycol (meth)acrylate, ethoxydiethylene glycol (meth)acrylate, butoxyethyl (meth)acrylate, butoxytriethylene glycol (meth)acrylate, 2-ethylhexylpolyethylene glycol (meth)acrylate, nonylphenylpolypropylene glycol (meth)acrylate, methoxydipropylene glycol (meth)acrylate, glycidyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, glycerol (meth)acrylate, polyethylene glycol (meth)acrylate, polypropylene glycol (meth)acrylate, epichlorohydrin (hereinafter abbreviated as ECH)-modified butyl (meth)acrylate, ECH-modified phenoxy (meth)acrylate, ethylene oxide (hereinafter abbreviated as EO)-modified phthalic acid (meth)acrylate, EO-modified succinic acid (meth)acrylate, caprolactone-modified 2-hydroxyethyl (meth)acrylate, N,N-dimethylaminoethyl (meth)acrylate, and N,N-diethylaminoethyl (meth)acrylate. These may be used alone or in combination of two or more kinds.

In particular, component (B) preferably contains a monofunctional (meth)acrylate having a substituted or unsubstituted alkyl group having 1 to 20 carbon atoms.

Examples of the alkyl group having 1 to 20 carbon atoms include a methyl group, an ethyl group, a propyl group, an isopropyl group, an n-butyl group, an isobutyl group, a sec-butyl group, a tert-butyl group, a pentyl group, an isopentyl group, a neopentyl group, an n-hexyl group, a heptyl group, an octyl group, a nonyl group, an n-decyl group, an undecyl group, a dodecyl group, and 2-ethylhexyl group.

The substituent that may exist on the alkyl group having 1 to 20 carbon atoms is not particularly limited and includes a hydroxy group, an epoxy group, and the like.

In particular, the component (B) preferably contains a monofunctional (meth)acrylate having an alkyl group having 1 to 20 carbon atoms, substituted with a hydroxy group; more preferably a monofunctional (meth)acrylate having an alkyl group having 1 to 8 carbon atoms, substituted with a hydroxy group; further preferably a monofunctional (meth)acrylate having an alkyl group having 1 to 4 carbon atoms, substituted with a hydroxy group; even more preferably at least one kind selected from the group consisting of 2-hydroxyethyl (meth)acrylate, 2-hydroxypropyl (meth)acrylate, 3-hydroxypropyl (meth)acrylate, and 4-hydroxybutyl (meth)acrylate; and particularly preferably at least one kind selected from the group consisting of 2-hydroxyethyl acrylate, 2-hydroxyethyl methacrylate, 4-hydroxybutyl acrylate, and 4-hydroxybutyl methacrylate. It is considered that the use of such component (B) improves compatibility with the component (C), resulting in improvement of thermosetting properties.

The mass ratio of the component (A) to the component (B) (the component (A):the component (B)) is preferably in the range of 20:80 to 80:20, more preferably 40:60 to 80:20, even more preferably 50:50 to 80:20, and particularly preferably 60:40 to 70:30. When the mass ratio thereof is within the above range, the adhesive can exhibit high conductivity (low connection resistance) when cured at a high temperature in a short time. Further, when the mass ratio thereof is within the above range, the adhesive can exhibit excellent adhesive strength to an adherend (in particular, an adherend having nickel on its outermost surface) when cured at a high temperature in a short time.

[Component (C)]

The component (C) according to the adhesive of the present invention is an organic peroxide. In particular, the component (C) is particularly preferably an organic peroxide represented by the following formula 1 because the curability (cure rate) is high and the effect of the present invention can be exhibited by curing for a shorter time.

[Chemical Formula 3]

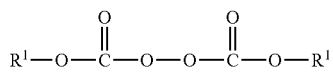

(Formula 1)

In the above formula 1, $R^1$ is each independently a substituted or unsubstituted monovalent hydrocarbon group. In the above formula 1, $R^1$ may be the same or different, but is preferably the same.

The monovalent hydrocarbon group may have either a chain structure or a cyclic structure, and examples thereof include an alkyl group having 1 to 20 carbon atoms, and a cycloalkyl group having 3 to 20 carbon atoms. Of these, it is preferably a cycloalkyl group having 3 to 20 carbon atoms, more preferably a cycloalkyl group having 4 to 10 carbon atoms, and even more preferably a cycloalkyl group having 6 to 8 carbon atoms.

The alkyl group having 1 to 20 carbon atoms is the same as those defined above.

The cycloalkyl group having 3 to 20 carbon atoms is not particularly limited and includes a cyclopropyl group, a cyclobutyl group, a cyclopentyl group, a cyclohexyl group, a cycloheptyl group, a cyclooctyl group, a norbornyl group, an adamantyl group, and the like, and a cyclohexyl group is preferable.

The substituent that may exist on the monovalent hydrocarbon group is not particularly limited and includes an alkyl group having 1 to 12 carbon atoms, preferably an alkyl group having 2 to 12 carbon atoms, and more preferably an alkyl group having 4 to 8 carbon atoms. The alkyl group having 1 to 12 carbon atoms may be either linear or branched, and preferably branched. The monovalent hydrocarbon group is not substituted with the same substituent. That is, the substituent alkyl group is not substituted with an alkyl group.

In particular, the component (C) is preferably an organic peroxide represented by the following formula 2, from the viewpoint of improvement of storage stability.

[Chemical Formula 4]

(Formula 2)

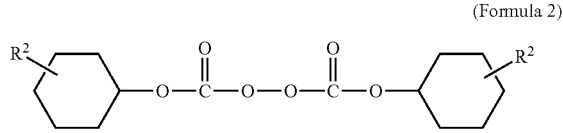

In the above formula 2, $R^2$ is each independently a hydrogen or a substituted or unsubstituted monovalent hydrocarbon group. In particular, $R^2$ is preferably an alkyl group having 2 to 12 carbon atoms, more preferably an alkyl group having 4 to 8 carbon atoms, even more preferably a branched alkyl group having 4 to 8 carbon atoms, and particularly preferably a tert-butyl group. In the above formula 2, $R^2$ may be the same or different, but is preferably the same.

Specific examples of the component (C) include, but are not limited to, di-n-propyl-peroxydicarbonate, di-iso-propyl-peroxydicarbonate, di(4-tert-butylcyclohexyl) peroxydicarbonate, di(2-ethylhexyl) peroxydicarbonate, and di-sec-butyl-peroxydicarbonate, and di(4-tert-butylcyclohexyl) peroxydicarbonate is particularly preferable.

As the component (C), either a commercially available component or a synthesized component may be used, and specific examples of the commercially available component include, but are not limited to, NPP-50M, IPP-50, IPP-27, TCP, OPP, SBP as PEROYL (registered trademark) series available from NOF Corporation.

The adhesive of the present invention preferably contains the component (C) in an amount of 1 to 10 parts by mass, and more preferably 3 to 5 parts by mass, relative to 100 parts by mass of the total of the components (A) and (B). Containing 1 part by mass or more of the component (C), the adhesive can exhibit high conductivity (low connection resistance) even by curing for a short time, and containing 10 parts by mass or less of the component (C), the adhesive can maintain storage stability.

[Component (D)]

The component (D) according to the adhesive of the present invention is conductive particles.

The conductive particles may exhibit electrical conductivity, and the material and shape of the particle are not limited.

The material of the conductive particle is not particularly limited and includes, for example, silver powder, nickel powder, palladium powder, carbon powder, tungsten powder, and plated powder. Of these, nickel powder or silver powder is more preferable, and silver powder is particularly preferable, in consideration of conductivity and price.

The shape of the conductive particle is not particularly limited and includes, for example, a spherical shape, an indefinite shape, a flake shape (scale shape), a filament (needle) shape, and a dendritic shape. Of these, flake-shaped conductive particles are preferably used from the viewpoint of reduction of volume resistivity (improvement of conductivity). The conductive particles may also be used by mixing two or more kinds of them. Further, from the viewpoint of having low cost of raw materials, conductive particles obtained by silver-plating of insulating metal oxide, nickel powder, or powder of an insulating body are preferable. Specific examples of the insulating metal oxide include copper powder, aluminum powder, or iron powder, and it is a metal having passivated object formed on a metal surface so as not to exhibit conductivity.

Each component (D) preferably has a 50% average particle diameter of 100 μm or less, and more preferably 1 to 10 μm, from the viewpoint of kneading the resin component. When the 50% average particle diameter is within the above range, the component (D) is uniformly dispersed in the resin component, so that the adhesive stably exhibits conductivity and adhesive strength. From the viewpoint of ensuring both the flowability of the adhesive and the electrical properties of the cured product, conductive particles having different 50% average particle diameters are preferably used in combination as the component (D), and conductive particles having a 50% average particle diameter of 3 μm or more and 10 μm or less (hereinafter referred to as a component (D-1)) and conductive particles having a 50% average particle diameter of 0.5 μm or more and less than 3 μm (hereinafter referred to as a component (D-2)) are more preferably used in combination. In the present specification, the 50% average particle diameter of the component (D) adopts a value measured with a laser particle size analyzer.

The specific surface area of the component (D) is preferably in the range of 0.1 to 10 $m^2/g$, and more preferably 0.3 to 5 $m^2/g$. For the same reason as described above, conductive particles having different specific surface areas are preferably used in combination as the component (D), and conductive particles having a specific surface area of 0.5 $m^2/g$ or more and less than 1 $m^2/g$ (a component (D'-1)) and conductive particles having a specific surface area of 1 $m^2/g$ or more and less than 3 $m^2/g$ (a component (D'-2)) are more preferably used in combination. In the present specification, the specific surface area adopts a value calculated by BET method.

The component (D) has a tap density of preferably 1 to 5 $g/cm^3$, and more preferably 2 to 4 $g/cm^3$.

The component (D) is preferably conductive particles that are surface-treated with stearic acid, and more preferably silver powder that is surface-treated with stearic acid. Although the specific reasons remain unclear, such conductive particles bring an effect of stabilizing the viscosity under an atmosphere of room temperature (particularly 25° C.)

As the method for treating the conductive particles with stearic acid, for example, a method of treating stearic acid diluted with a solvent together with conductive particles using a ball mill or the like and then drying the solvent is known, but the method is not limited thereto.

The adhesive of the present invention preferably contains the component (D) in an amount of 50 to 1000 parts by mass, more preferably 50 to 500 parts by mass, even more preferably 50 to 200 parts by mass, and particularly preferably 50 to 100 parts by mass, relative to 100 parts by mass of the total of the components (A) and (B). The adhesive exhibits good conductivity when containing 50 parts by mass or more of the component (D), and it has excellent workability without causing stringing when containing 1000 parts by mass or less of the component (D).

When the components (D-1) and (D-2) are used in combination as the component (D), the mass ratio of the component (D-1) to the component (D-2) (the component (D-1): the component (D-2)) is preferably in the range of 40:60 to 90:10, more preferably 50:50 to 80:20, and even more preferably 60:40 to 70:30. When the mass ratio thereof is within the above range, both the flowability of the adhesive and the electrical properties of the cured product can be more highly ensured. Further, for the same reason as described above, the mass ratio of the component (D'-1) to the component (D'-2) (the component (D'-1):the component (D'-2)) is preferably in the range of 40:60 to 90:10, more preferably 50:50 to 80:20, and even more preferably 60:40 to 70:30.

[Other Components]

(Adhesion-Imparting Agent)

The adhesive of the present invention allows further addition of an adhesion-imparting agent as long as the characteristics of the present invention are not impaired. The adhesion-imparting agent is not particularly limited as long as it is compatible with the component (A) or (B), but is preferably a phenoxy resin or a (meth)acrylic acid, and particularly preferably a phenoxy resin. Although the specific reasons remain unclear, the phenoxy resin has an effect of improving adhesion to an adherend of nickel. It is known that a nickel adherend may have deteriorated adhesiveness due to the characteristics of metal. Further, the ratio of the adhesive component in the whole conductive adhesive is low, and the conductive adhesive is likely to have lower adhesive force than other adhesives. Addition of a phenoxy resin, however, improves adhesiveness to nickel.

Specific examples of the phenoxy resin include, but are not limited to, 1256, 4250, 4275 as jER (registered trademark) series available from Mitsubishi Chemical Corporation; and YP-50, YP-50S, and YP-70 available from Nippon Steel & Sumikin Chemical Co., Ltd.

(Stabilizer)

The adhesive of the present invention allows further addition of a stabilizer as long as the characteristics of the present invention are not impaired. The stabilizer includes a phosphate ester compound, and is specifically a compound represented by the following formula 3. In the following formula 3, $R^3$ is an organic group, and n is 1 or 2. The organic group includes the above-mentioned monovalent hydrocarbon group.

The phosphate ester compound has an effect of stabilizing the viscosity under an atmosphere of 25° C., and specific examples thereof include, but are not limited to, ethyl acid phosphate, butyl acid phosphate, butoxyethyl acid phosphate, oleyl acid phosphate, 2-ethylhexyl acid phosphate, 2-hydroxyethyl methacrylate acid phosphate, and dibutyl phosphate. The phosphate ester compound preferably has a (meth)acryl group in the molecule as represented by the following formula 4. In the following formula 4, $R^4$ is a hydrogen or a methyl group, $R^5$ is a divalent hydrocarbon group, and n is 1 or 2. Since the compound represented by the following formula 4 involves radical polymerization during curing, the compound is not volatilized out of the cured product when the cured product is heated, so that outgassing can be reduced.

[Chemical Formula 5]

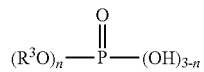

Formula 3

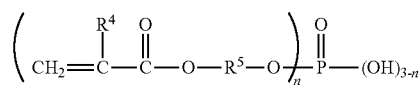

Formula 4

Specific examples of the phosphate ester compound include, but are not limited to, JP-502, JP-504, JP-508, JPA-514, JP-506H, JP-518-O, and DBP available from Johoku Chemical Co., Ltd.; LIGHT ESTER P-1M available from Kyoeisha Chemical Co., Ltd.; and MR-200 available from Daihachi Chemical Industry Co., Ltd.

The adhesive preferably contains the phosphate ester compound in an amount of 0.01 to 5.0 parts by mass, relative to 100 parts by mass of the total of the components (A) and (B). Containing 0.01 parts by mass or more of the phosphate ester compound, the adhesive has good storage stability, and containing 5.0 parts by mass or less of the phosphate ester compound, the adhesive can maintain curability.

(Polymerization Inhibitor and Chelating Agent)

Further, the adhesive of the present invention allows addition of a polymerization inhibitor, a chelating agent, or the like as long as the characteristics of the present invention are not impaired. The polymerization inhibitor can also be used to maintain storage stability by capturing generated radical species. The chelating agent can be used to capture generated metal ions.

Specific examples of the polymerization inhibitor include, but are not limited to, a quinone-based polymerization inhibitor such as hydroquinone, methoxy hydroquinone, benzoquinone, and p-tert-butyl catechol; an alkylphenol-based polymerization inhibitor such as 2,6-di-tert-butylphenol, 2,4-di-tert-butylphenol, 2-tert-butyl-4,6-dimethylphenol, 2,6-di-tert-butyl-4-methylphenol, and 2,4,6-tri-tert-butylphenol; an amine-based polymerization inhibitor such as alkylated diphenylamine, N,N'-diphenyl-p-phenylenediamine, phenothiazine, 4-hydroxy-2,2,6,6-tetramethylpiperidine, 4-benzoyloxy-2,2,6,6-tetramethylpiperidine, 1,4-dihydroxy-2,2,6,6-tetramethylpiperidine, and 1-hydroxy-4-benzoyloxy-2,2,6,6-tetramethylpiperidine; an N-oxyl-based polymerization inhibitor such as 2,2,6,6-tetramethylpiperidine-N-oxyl, 4-hydroxy-2,2,6,6-tetramethylpiperidine-N-oxyl, and 4-benzoyloxy-2,2,6,6-tetramethylpiperidine-N-oxyl; and the like.

Specific examples of the chelating agent include EDTA-2Na and EDTA-4Na available from Dojindo Laboratories, and the chelating agent in a liquid form at 25° C. includes MZ-8 available from Chelest Corporation, though not limited thereto.

If an addition amount of the polymerization inhibitor or the chelating agent is too large, the storage stability is improved, but reactivity becomes lower. Therefore, the addition amount thereof is preferably 0.001 to 1.0% by mass, relative to the total solid content of the adhesive.

(Filler)

The adhesive of the present invention allows further addition of a filler as long as the characteristics of the present invention are not impaired. The filler may be classified into an inorganic filler and an organic filler. Examples of the inorganic filler include metal powder not exhibiting any conductivity (metal powder having passivated object formed on a powder surface as caused by oxidation), alumina powder, calcium carbonate powder, talc powder, silica powder, and fumed silica powder. The organic filler includes, but is not limited to, acryl particles, rubber particles, and styrene particles. By adding a filler, viscosity or thixotropy can be controlled and also an increase in strength can be obtained. Powder characteristics such as average particle diameter or shape are not particularly limited. However, considering easy dispersion in the thermosetting conductive adhesive and nozzle clogging, the average particle diameter is preferably 0.001 to 50 μm. By adding fumed silica powder, in particular, not only the thixotropy is provided but also the storage stability is maintained at the same time. Specific examples of the fumed silica powder include, but are not limited to, AEROSIL (registered trademark) R805 and R972 available from Nippon Aerosil Co., Ltd.

The filler is preferably added in an amount of 0.1 to 10 parts by mass, relative to 100 parts by mass of the total of the components (A) and (B). When containing 0.1 part by mass or more of the filler, the fluidity can be stabilized, and the workability can also be improved. When containing 10 parts by mass or less of the filler, the storage stability can be maintained.

The adhesive of the present invention may additionally contain a suitable amount of additives such as a colorant including a pigment and a dye, a flame retardant, an anti-oxidant, an anti-foaming agent, a coupling agent, a leveling agent, or a rheology control agent as long as the characteristics of the present invention are not impaired. The addition of them can give an adhesive excellent in conductivity, resin strength, adhesive strength, workability, storage stability or the like, or a cured product of the adhesive.

The adhesive of the present invention can be suitably used on an adherend having poor adhesiveness such as an adherend having nickel on its outermost surface, and when cured at a high temperature in a short time, the adhesive can exhibit excellent adhesive strength (e.g., 2 MPa or more). The adhesive can also exhibit high conductivity (low connection resistance). The adherend having nickel on its outermost surface includes a nickel-plated plate, and is prepared by a known method such as an electroless plating method, an electrolytic plating method, or the like. Materials to be plated are not particularly limited. The thickness of the plated layer is not particularly limited, but is, for example, in the range of 0.01 to 0.5 µm. Thus, the adhesive according to one preferred embodiment of the present invention is used on an adherend having nickel on its outermost surface.

Accordingly, the present invention also provides a method of using the adhesive of the present invention including coating and curing the adhesive to an adherend having nickel on its outermost surface. In the method, when the curing is performed at high temperature in a short time, the effect of the present invention is particularly remarkably exhibited.

EXAMPLES

The present invention will be described in further details hereinbelow by means of Examples, without intending to limit the present invention only to these Examples. A thermosetting conductive adhesive is hereinafter also referred to simply as "adhesive".

Examples 1 to 3 and Comparative Examples 1 to 7

In order to prepare an adhesive, the following components were prepared.

Component (A)
  Aromatic urethane-modified acrylate oligomer (the number of acryl groups: 6, weight average molecular weight: 1,000, cured product Tg: 49° C.) (EBECRYL220, available from Daicel-Allnex Ltd.)
  Aliphatic urethane-modified acrylate oligomer (the number of acryl groups: 2, weight average molecular weight: 1,000, cured product Tg: 14° C.) (EBECRYL8402, available from Daicel-Allnex Ltd.)
Component (A'): Polyfunctional Acrylate Compounds Other than Component (A)
  Aliphatic urethane-modified acrylate oligomer (the number of acryl groups: 6) (EBECRYL8301R, available from Daicel-Allnex Ltd.)
  Aliphatic urethane-modified acrylate oligomer (the number of acryl groups: 3, weight average molecular weight: 1,500) (EBECRYL9260, available from Daicel-Allnex Ltd.)
  Dipentaerythritol hexaacrylate (DPHA, available from Daicel-Allnex Ltd.)
Component (B): Monofunctional (Meth)Acrylate Monomer
  2-hydroxyethyl methacrylate (HEMA, available from Nippon Shokubai Co., Ltd.)
  4-hydroxybutyl acrylate (4HBA, available from Osaka Organic Chemical Industry Ltd.)
Component (C): Organic Peroxide
  Di(4-tert-butylcyclohexyl) peroxydicarbonate (PEROYL (registered trademark) TCP, available from NOF Corporation)
Component (D): Conductive Particles
  Conductive particles 1: Flake-shaped silver powders that are surface-treated with stearic acid having the following powder properties
  Tap density: 3.17 g/cm$^3$
  50% average particle diameter: 5.0 µm
  BET specific surface area: 0.67 m$^2$/g
  Conductive particles 2: Flake-shaped silver powders that are surface-treated with stearic acid having the following powder properties
  Tap density: 3.57 g/cm$^3$
  50% average particle diameter: 1.2 µm
  BET specific surface area: 2.01 m$^2$/g The adhesives of Examples 1 to 3 and Comparative Examples 1 to 7 were prepared based on the preparation listed in Table 1 below. The components (A) and (B) were weighed and then charged into a stirring pot to be stirred for 1 hour. Further, the component (C) was added thereto and stirred for 30 minutes. Finally, the component (D) was weighed and then charged into a stirring pot to be stirred for 1 hour. The detailed preparation amounts were based on the description presented in Table 1 and all numerical values were indicated by part(s) by mass.

TABLE 1

| Components | Raw materials | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Component (A) | EBECRYL220 | 66 | 66 | | | | | | | | |
|  | EBECRYL8402 | | | 66 | 66 | | | | | | |
| Component (A') | EBECRYL8301R | | | | | 66 | | | 66 | | |
|  | EBECRYL9260 | | | | | | 66 | | | 66 | |
|  | DPHA | | | | | | | 66 | | | 66 |
| Component (B) | HEMA | 34 | | | 34 | 34 | 34 | 34 | | | |
|  | 4HBA | | 34 | 34 | | | | | 34 | 34 | 34 |

TABLE 1-continued

| Components | Raw materials | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Component (C) | PEROYL TCP | 5 | 5 | 5 | 5 | 5 | 5 | 5 | 5 | 5 | 5 |
| Component (D) | Conductive particles 1 | 66 | 66 | 66 | 66 | 66 | 66 | 66 | 66 | 66 | 66 |
|  | Conductive particles 2 | 34 | 34 | 34 | 34 | 34 | 34 | 34 | 34 | 34 | 34 |
|  | Total | 205.0 | 205.0 | 205.0 | 205.0 | 205.0 | 205.0 | 205.0 | 205.0 | 205.0 | 205.0 |

With respect to the adhesives of Examples 1 to 3 and Comparative Examples 1 to 7, connection resistance measurement, volume resistivity measurement, and adhesive strength measurement were carried out according to the methods described below. The results of the curing under the atmosphere of 130° C. were summarized in Table 2, and the results of the curing under the atmospheres of 120° C. and 110° C. were summarized in Table 3.

[Connection Resistance Measurement]

Five holes each having a diameter of 5 mm were opened at an interval of 10 mm in a 100 μm-thick masking tape. The masking tape was attached to an electroless nickel-plated plate of 25 mm wide×100 mm long×1.6 mm thick, the adhesive was squeezed thereto, and then the masking tape was removed. The adhesive was left to stand for 5 minutes under atmospheres of 110° C., 120° C., and 130° C., to be cured. A needle-like electrode was touched to the adjacent cured products, and the resistance thereof was measured to be a "connection resistance (Ω)". In Tables 2 and 3, "K" represents kilo, "M" represents mega, and "OL" represents over the upper measurement limit. The connection resistance is preferably 50Ω or less, more preferably 40Ω or less, and even more preferably 35Ω or less, from the viewpoint of stability of conductivity.

[Volume Resistivity Measurement]

On a glass plate of 2.0 mm thick×50 mm wide×100 mm long, a masking tape (50 μm thick) was attached so as to have a size of 100 mm long×10 mm wide. The adhesive was then squeezed thereto to form a uniform coating film, so that a test piece was prepared (n=2). The test piece was charged into a hot air drying furnace under atmospheres of 110° C., 120° C., and 130° C. After allowing it to stand for 5 minutes, the test piece was taken out from the hot air drying furnace. After the temperature of the test piece decreased to 25° C., using a dual display multimeter attached with plate-like electrodes, the "resistance value (Ω)" was measured in a state in which the distance between the electrodes was 50 mm. From the resistance value, distance between the electrodes, and thickness of the adhesive after curing, the "volume resistivity (×10$^{-3}$ Ω·m) was calculated to give an average value. In Tables 2 and 3, "OL" represents over the upper measurement limit. The volume resistivity is preferably 300×10$^{-3}$ Ω·m or less, more preferably 250×10$^{-3}$ Ω·m or less, and even more preferably 200×10$^{-3}$ Ω·m or less, from the viewpoint of ensuring the conductivity.

[Adhesive Strength Measurement]

On an electroless nickel-plated plate of 1.6 mm thick×25 mm wide×100 mm long, a masking tape was attached so as to have a size of 5 mm wide×50 μm thick.

The adhesive was then squeezed thereto to form a uniform coating film, and the masking tape was removed. On the coating film, a ceramic chip of 2φ×1 mm was vertically dropped from a height of 1 cm above the coating film, so that a test piece was prepared (n=5). The test piece was charged into a hot air drying furnace under atmospheres of 110° C., 120° C., and 130° C. within 5 minutes. After allowing it to stand for 5 minutes, the test piece was taken out from the hot air drying furnace. After the temperature of the test piece decreased to 25° C., a digital force gauge provided with a contact was moved at 50 mm/min while the nickel-plated plate remains fixed, and by pressing the chip with the contact in the vertical direction relative to the long side of the test piece, the "maximum strength (N)" was measured. According to conversion based on the contact area, the "adhesive strength (MPa)" was calculated and then determined by using the following evaluation criteria. In order for an adherend not to depart, the adhesive strength is preferably 1 MPa or more, more preferably 2 MPa or more, and even more preferably 5 MPa or more.

TABLE 2

| Curing temperature | Test items | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| 130° C. | Connection resistance (Ω) | 16 | 4 | 5 | 80K | 30K | 40 | 30K | 6M | 500K | 7M |
|  | Volume resistivity (×10$^{-3}$ Ω·m) | 1.3 | 0.3 | 0.1 | 220 | 7000 | 0.3 | 7000 | 5.0 | OL | 0.1 |
|  | Adhesive strength (MPa) | 5.4 | 2.5 | 5.4 | 7.7 | 0.8 | 2.4 | 0.6 | 0.8 | 6.7 | 0.7 |

TABLE 3

| Curing temperature | Test items | Example 1 | Example 2 | Example 3 | Comparative Example 1 | Comparative Example 2 | Comparative Example 3 | Comparative Example 4 |
|---|---|---|---|---|---|---|---|---|
| 120° C. | Connection resistance ($\Omega$) | 22 | 35 | 30 | 20M | 110M | 90 | 130M |
| | Volume resistivity ($\times 10^{-3}\ \Omega \cdot m$) | 20 | 30 | 250 | 170 | 200 | 0.5 | 320 |
| | Adhesive strength (MPa) | 8.9 | 7.7 | 6.5 | 6.8 | 0.7 | 7.5 | 0.5 |
| 110° C. | Connection resistance ($\Omega$) | 30 | 7 | 20 | 190M | OL | 180 | OL |
| | Volume resistivity ($\times 10^{-3}\ \Omega \cdot m$) | 110 | 120 | 110 | 100 | 30 | 0.9 | 110 |
| | Adhesive strength (MPa) | 12.7 | 6.9 | 4.3 | 6.8 | 0.6 | 7.5 | 1.1 |

According to Tables 2 and 3, the characteristics vary depending on the change of the curing temperature. At the curing temperatures, however, the connection resistances of Examples 1 to 3 show lower values than those of Comparative Examples. As in Comparative Example 3, even though the volume resistivity exhibits a low value, the connection resistance may become high, so that the volume resistivity is not necessarily low. Although this is not clearly elucidated, it is deduced that the connection resistance does not become low even though the resistance value of the adhesive is low because the nickel-plated adherend is affected by the oxidation state of plating. In Examples 1 and 2, an aromatic urethane-modified (meth)acrylate oligomer having six (meth)acryl groups in the molecule as the component (A) (that is the component (A-1)) and a monofunctional (meth) acrylate monomer as the component (B) are used in combination. In Example 3, an aliphatic urethane-modified (meth)acrylate oligomer having two (meth)acryl groups in the molecule as the component (A) (that is the component (A-2)) and a monofunctional acrylate monomer as the component (B) are used in combination. In Comparative Examples 1 to 7 in which the components have been used in combinations other than those described above, the connection resistance cannot be maintained low. In Examples 1 to 3, the adhesive strength to the nickel-plated plate is also stably exhibited. In particular, Example 1 shows the adhesive strength of 5 MPa or more regardless of the curing temperature, so that excellent adhesive strength can be stably exhibited.

INDUSTRIAL APPLICABILITY

The conductive adhesive of the present invention can exhibit high conductivity (low connection resistance) when cured at a high temperature in a short time. In addition, the conductive adhesive can exhibit excellent adhesive strength to a metal adherend having poor adhesiveness such as a nickel plated adherend. From these characteristics, the conductive adhesive can be used for assembly of various electronic components, so that it may be widely developed for use.

The present invention is by no means limited to the embodiments described above, and it can be suitably modified in the range not departing from the scope of the present invention.

The entire contents of the specifications of Japanese Patent Application No. 2016-126946 filed on Jun. 27, 2016 is hereby incorporated by reference.

The invention claimed is:

1. A thermosetting conductive adhesive comprising:
component (A): a urethane-modified polyfunctional (meth)acrylate oligomer that is either an aromatic urethane-modified (meth)acrylate oligomer having six (meth)acryl groups in the molecule or an aliphatic urethane-modified (meth)acrylate oligomer having two (meth)acryl groups in the molecule;
component (B): a monofunctional (meth)acrylate monomer having an alkyl group having 1 to 20 carbon atoms substituted with a hydroxyl group;
component (C): an organic peroxide; and
component (D): silver powder that is surface-treated with stearic acid,
wherein when the component (A) is an aliphatic urethane-modified (meth)acrylate oligomer having two (meth) acryl groups in the molecule, the component (B) is a monofunctional acrylate monomer,
wherein the component (C) is an organic peroxide represented by the following formula 2:

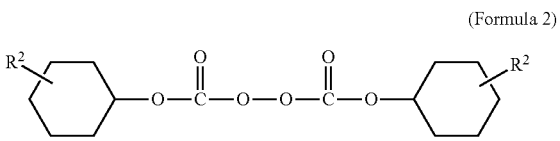

(Formula 2)

wherein $R^2$ is each independently a hydrogen or a substituted or unsubstituted monovalent hydrocarbon group,
wherein a content of the component (D) is 50 to 1000 parts by mass relative to 100 parts by mass of the total of the component (A) and the component (B), and the component (D) has a 50% average particle diameter of 1 to 10 μm, and
wherein a cured product of the thermosetting conductive adhesive has an isotropic electrical conductivity.

2. The thermosetting conductive adhesive according to claim 1, wherein the (meth)acryl group of the component (A) is an acryl group.

3. The thermosetting conductive adhesive according to claim 1, wherein the adhesive is used on an adherend having nickel on an outermost surface thereof.

4. The thermosetting conductive adhesive according to claim 1, wherein the component (D) comprises component (D-1): silver powder having a 50% average particle diameter of 3 μm or more and 10 μm or less and component (D-2): silver powder having a 50% average particle diameter of 0.5 μm or more and less than 3 μm.

5. The thermosetting conductive adhesive according to claim 4, wherein a mass ratio of the component (D-1) to the component (D-2) is in the range of 60:40 to 70:30.

6. The thermosetting conductive adhesive according to claim 1, wherein the component (B) is a monofunctional acrylate monomer having an alkyl group having 1 to 20 carbon atoms substituted with a hydroxyl group.

7. The thermosetting conductive adhesive according to claim 1, wherein the component (A) is an aromatic urethane-modified (meth)acrylate oligomer having six (meth)acryl groups in the molecule.

8. The thermosetting conductive adhesive according to claim 1, wherein a curing agent of the thermosetting conductive adhesive consists of the component (C).

9. The thermosetting conductive adhesive according to claim 1, wherein conductive particles of the thermosetting conductive adhesive consist of the component (D).

10. The thermosetting conductive adhesive according to claim 1, wherein the silver powder that is surface-treated with stearic acid is obtained by a method of treating stearic acid diluted with a solvent together with a flake-shaped silver powder using a ball mill and then drying the solvent.

* * * * *